(No Model.)
W. MUNN.
COFFEE POT.
No. 269,697. Patented Dec. 26, 1882.
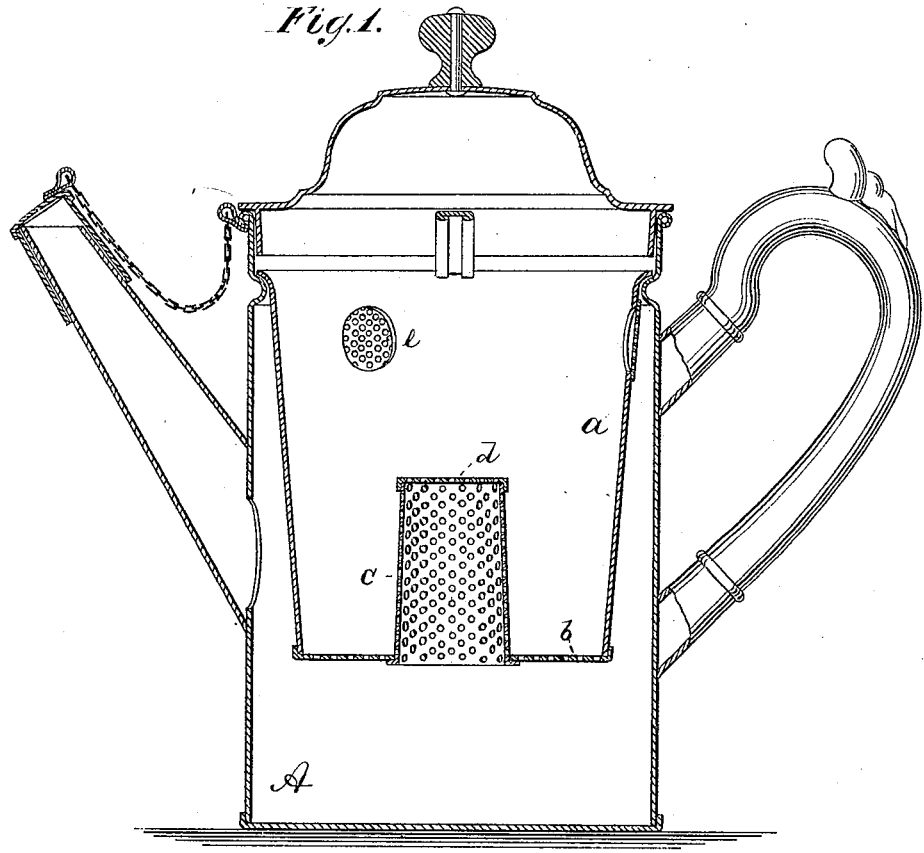
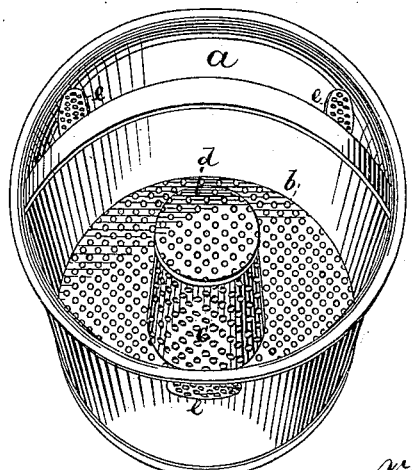
WITNESSES:
Maurice Leyne
Jos. J. McGinley
INVENTOR:
William Munn
by his attorney
Frank v. Briesen

UNITED STATES PATENT OFFICE.

WILLIAM MUNN, OF BROOKLYN, NEW YORK.

COFFEE-POT.

SPECIFICATION forming part of Letters Patent No. 269,697, dated December 26, 1882.

Application filed April 12, 1882. (No model.)

*To all whom it may concern:*

Be it known that I, WILLIAM MUNN, of Brooklyn, E. D., Kings county, State of New York, have invented a new and Improved Coffee-Pot, of which the following specification is a full, clear, and exact description.

This invention has for its object to thoroughly impregnate coffee or tea with the water and steam in a coffee-pot, and thus to abstract a greater amount of flavor from the coffee or tea than can be done with the coffee-pots now generally in use.

The invention consists in the combination of a coffee-pot with an inner vessel having a strainer projecting upward from its bottom and steam-passages near its upper edge, whereby a circulation of steam is effected, all as hereinafter more fully pointed out.

In the accompanying drawings, Figure 1 is a longitudinal vertical central section of my improved coffee pot. Fig. 2 is a perspective view of the inner vessel.

Similar letters of reference indicate corresponding parts in both figures.

The letter A represents a coffee-pot of suitable size and material. Into this pot is hung so as to be removable therefrom an inner vessel, *a*, which is preferably tapering and shorter than the pot A. The bottom of the vessel *a* is perforated to constitute a strainer, *b*. From this bottom projects upward into the vessel *a* a central cylindrical strainer, *c*, closed at its top by a strainer, *d*, or otherwise. Near the upper edge of the vessel *a* are three (more or less) small steam-passages, *e e*.

Ground coffee is placed into the vessel *a*, around strainer *c*. The pot is placed upon a stove and boiling water poured upon the coffee. Part of the steam from the ready coffee, accumulating at the bottom of pot A, will rise through the cylindrical strainer *c*, pass through the coffee in vessel *a*, and pass outward into pot A through the steam-passages *e e*. Another part of said steam will rise between the vessels A and *a*, enter the latter through the passages *e e*, and in cooling will descend and re-enter vessel A through strainer *c*. In this way a constant circulation of steam is produced, by which the strength of the coffee will be effectively extracted.

I am aware that coffee-pots are known having apertures near the upper edge of an interior vessel for the passage of boiling water from the outer vessel into the interior vessel, such as in Letters Patent No. 186,378, of January 16, 1877, and I do not claim the same; but I do claim—

The combination of vessel A with inner vessel, *a*, having steam-passages *e e* near its upper end, and a cylindrical strainer, *c*, projecting upward from its bottom, so that a circulation of steam is effected through the strainer *c* upward to vessel *a* and through passages *e e* downward to pot A, substantially as specified.

WILLIAM MUNN.

Witnesses:
F. V. BRIESEN,
JOS. J. MCGINLEY.